FACSIMILE SYSTEM WITH MAGNETIC TAPE STORAGE HAVING SELECTIVELY SYNCHRONIZED DRIVES
Filed June 13, 1967
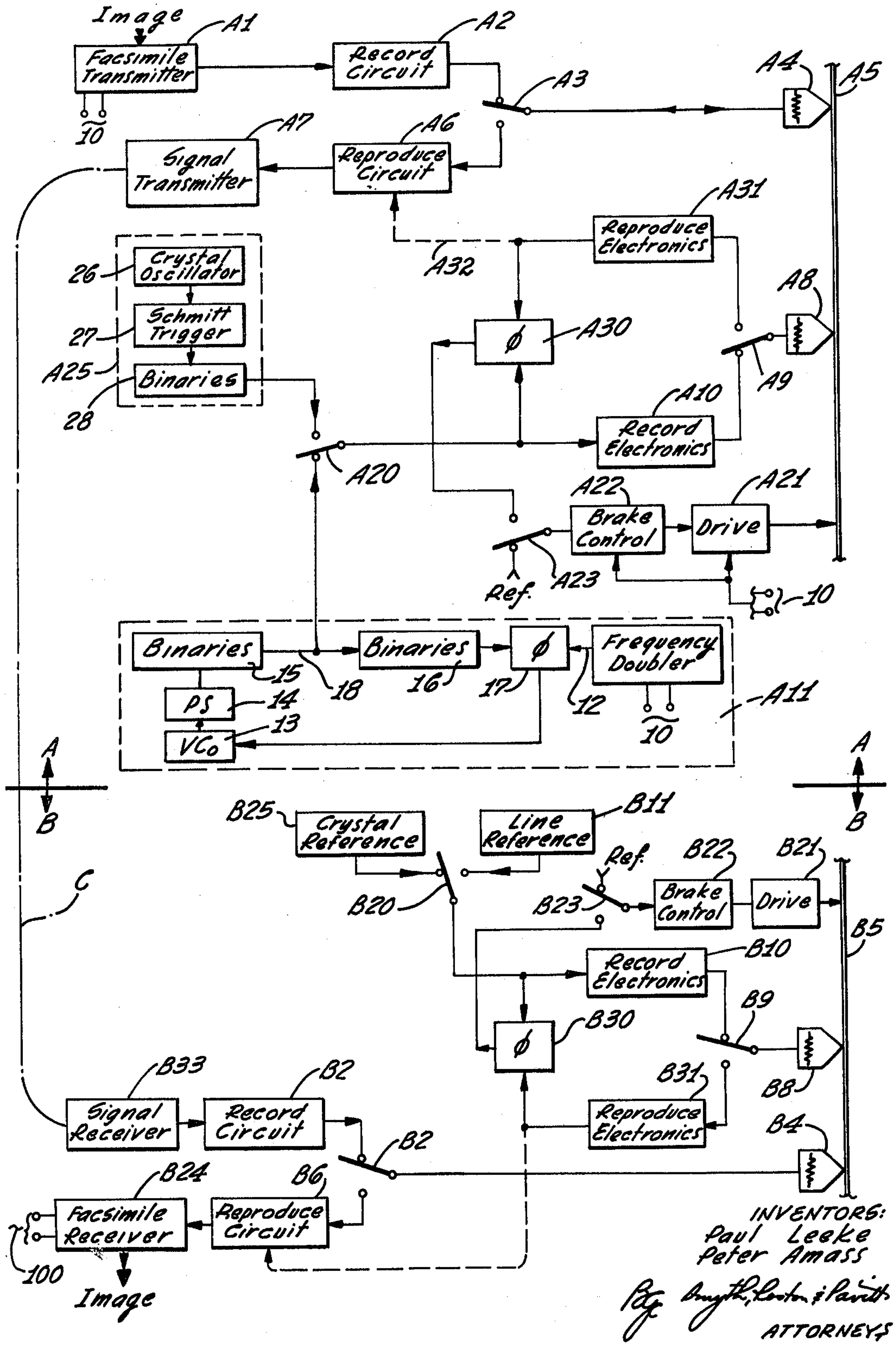
INVENTORS:
Paul Leeke
Peter Amass
By [signature]
ATTORNEYS United States Patent Office 3,499,978
Patented Mar. 10, 1970

3,499,978
FACSIMILE SYSTEM WITH MAGNETIC TAPE STORAGE HAVING SELECTIVELY SYNCHRONIZED DRIVES

Peter Amass, Camarillo, and Paul Leeke, Ventura, Calif., assignors to Minnesota Mining and Manufacturing Company, St. Paul, Minn., a corporation of Delaware Filed June 13, 1967, Ser. No. 645,820
Int. Cl. H04n 5/76
U.S. Cl. 178—6.6 13 Claims

ABSTRACT OF THE DISCLOSURE

A facsimile system operates with two facsimile transmit-receive units coupled indirectly to each other by magnetic tape units which communicate directly with each other. The tape units have drives controlled differently when communicating with the respective facsimile unit or the respective other tape unit.

The present invention relates to a facsimile transmission method and system and to improvements in stations adapted for transmitting and/or receiving facsimile information.

The transmission of facsimile information usually involves three different operations which concur except for the finite transit time of electrical signals. First, an image is converted into an electrical signal by line scanning of a picture, whereby a signal is produced which characteristically varies in accordance with the contrast variations of the image along the scanning lines. Secondly, that signal is then transmitted from one station to a second one via suitable transmission facilities such as telephone lines, teletype cables, radio link, etc. Thirdly, in the second station the signal, as received, is used to control a process according to which a picture is composed.

The composition of the picture in station two must concur with the production of the electrical signal in station one, which means that the two facsimile units must run in strict synchronism. Such synchronism can be obtained if the two stations draw power from the same mains, either directly or due to power grid linkage. However, no such nation-wide power grid exists so that the required synchronism cannot readily be established in all cases. The invention remedies this situation and makes additionally use of the fact that the recording of facsimile information has become increasingly of interest, for example, when transmission lines are shared by other communication facilities, or when the receiving station desires to provide multiple copies of the transmitted image information.

In accordance with the present invention, the line-synchronously produced facsimile signal is first recorded, for example, on a magnetic tape, together with a line synchronous reference signal. For transmission, the recorded facsimile signals are reproduced whereby the motion of the tape is controlled towards a particular relationship, for example, a fixed phase between the reproduced reference and a frequency standard, for example, as derived from a constant oscillator. The reproduced facsimile signal is then transmitted. Either reference signal is not transmitted except that the reproduced reference signal may be an integral component of the facsimile information signal. On the receiver side, the facsimile signal is received and recorded together with a standard reference signal. For image composition the recorded signal is reproduced and the reproduction rate, i.e., for example, the tape speed, is controlled again towards a particular relationship, for example, a fixed phase between the reproduced reference signal and a power line synchronous reference signal, whereby the power line frequency phases the picture composing process.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which there is illustrated a block diagram representing transmitting station and a receiver station for facsimile information.

The drawing shows a facsimile transmission system in accordance with the preferred embodiment of the invention. The upper half of the drawing shows the station A and the lower half shows the station B remotely positioned from station A but linked thereto for, possibly, two-way communication through a land line, a radio transmission-like or the like and generally denoted by line C. Thus, the transmission facility C encompasses any transmission of facsimile signals. The invention does not depend on any particular type of transmission facility.

The system is shown in a manner to explain operation of inventive method and system for an operating situation in which the image of a document in station A is to be transmitted for pictorial reproduction in station B. Therefore, the system is illustrated to show the essentials for a one-way communication. Two-way communication will accordingly require all elements shown for station A also to be in station B and vice versa.

Before going into further details concerning the stations as linked, and assuming that two communications have to be provided for, it is briefly stated that each station has basically four operate modes: The transmit-record mode, in which a facsimile signal is generated and recorded; the transmit-reproduce mode, in which a recorded facsimile signal is reproduced and transmitted through facility C. These two modes will be described with reference to station A. The next two modes will be described with reference to station B; these are the receive-record mode, in which facsimle information is received from the facility C and recorded; and the receive-reproduce mode, in which the recorded facsimile signal is reproduced and used to compose a picture.

The station A comprises a facsimile transmitter A1 which is of the conventional type converting an image into a line-for-line electrical scanning signal. The facsimile transmitter A1 is driven by and in synchronism with the local power supply, for example, the mains denoted as numeral 10. Briefly speaking, the facsimile transmitter A1 will comprise a focused beam which scans the document to be reproduced in a line-for line scanning pattern. The light beam is reflected and at least some of the reflected light is observed by a photo detector. The reflected light is intensity modulated in accordance with the contrast of the document. The photo detector or receiver responding to this light produces a correspondingly varying output signal.

Facsimile transmitters are not of uniform type, but in general, one can say that they furnish the facsimile information as AM or FM signals in the range of audio frequencies. An output signal of that type is now provided by the unit A1 and then passed to a record circuit A2 which may provide for additional, suitable amplification and impedance matching so that the output signal of the circuit network A2 is capable of driving a transducer.

A mode switch A3 is provided and shown in a position for the transmit-record mode of the station A. This mode switch A3 connects the output of the circuit A2 to a data transducer A4 cooperating with a magnetic tape A5 for inscribing thereon a data track, the data being recorded as a faithful representation of the facsimile signal. In the transmit reproduce mode the mode switch A3 connects the transducer A4 to a reproduce circuit network A6. In this mode the transducer A4 operates as read or reproduce transducer and provides an output signal representative of the data previously recorded to the reproduce circuit A6 which includes suitable amplification stages and equalizing networks to provide an output signal capable of driving a signal transmitter A7. This signal transmitter A7 is now linked to the line C in order to transmit the facsimile signal, for example, through telephone or teletype facilities or any other signal transmission facilities commonly used for facsimile transmission.

One can see, therefore, that the facsimile transmitter A1 does not directly communicate with the transmitter A7 but there is interposed the record carrier A5 onto which the signal to be transmitted is recorded first for subsequent transmission. This way, the facsimile scanning process is rendered independent from the actual transmission in various respects including, for example, the time of scanning and the time of transmission, either period can be selected to be the most convenient one in relation to other operations.

During the transmit-record mode of station A, facsimile data are line-synchronously produced and then recorded on the tape A5 by the transducer A4 along a particular track. That signal includes fluctuations resulting from fluctuations in the frequency of the power source 10. If all subsequent processors in the entire system would operate likewise directly under influence of these fluctuations, nothing needs to be done for any elimination of the fluctuations. However, this would be an erroneous assumption. Therefore, a reference is needed now which fixes the phase of the line-synchronous scanning process and the signal production by the facsimile transmitter A1. A line-synchronous reference signal is inscribed on tape A5 by means of a second transducer A8 and in a track which runs parallel to the data track. This reference signal is produced as follows.

A mode switch A9 is capable of causing operation of the transducer A8 selectively as record transducer or as reproduce transducer. The mode switch A9 is ganged to or otherwise linked to mode switch A3 for concurrent positioning. Presently the transmit-record mode is described, so that the switch A9 will be in the illustrated position connecting a record electronic circuit network A10 to the transducer A8. During the transmit-record mode a third mode switch A20 has the illustrated position so that the signal processed by record electronic A10 is derived from a network A11 which includes components to derive a suitably recordable reference signal from the power line 10.

The power line 10 may produce a 60 c.p.s. signal which is preferably subjected to frequency doubling, for example, by rectifying the 60 c.p.s. signal in a full-wave rectifier and transmitting the rectified signal via a transformer so that a 120 c.p.s. signal appears in a channel 12, having, of course, a particular phase relationship to the AC power line voltage particularly as driving the facsimile transmitter A1. Within this network A11 there is next provided a voltage controlled oscillator 13 which may produce, for example, a sinusoidal signal having a frequency of 3.84 kc. The VCO 13 may, for example, be a voltage controlled multivibrator or the like.

The output of VCO 13 is passed to a pulse shaper 14 such as a Schmitt trigger and subjected subsequently to frequency division by several binary stages 15 composed, for example, of two cascaded toggle flip-flops. The binary stages 15 thus provide a 1:4 frequency division so that the output signal has a frequency of 960 c.p.s. The 960 c.p.s. signal is passed to another frequency divider unit 16 having altogether three cascaded binary stages and providing a 1:8 frequency reduction so that the output side of the binary stages 16 is a 120 c.p.s. signal.

The output signal of the binary stages 16 is passed to a phase detector 17 receiving also from channel 12 the 120 c.p.s. signal as derived from the mains 10. Phase detector 17 produces an output signal which is a DC signal having value which is representative of the phase difference between the two signals applied to its inputs. This DC output signal of phase detector 17 is used to adjust and control the VCO 13. Therefore, by way of closed loop operation, the 960 c.p.s. signal as derivable from the binary 15 has a fixed phase relationship to the local AC power source 10.

The mode switch A20 connects the output line 18 of the network A11 to the input of the record electronics A10. Thus, this 960 c.p.s., phase regulated signal is processed in the record electronics A10 to assume a suitable power level at suitable impedance conditions so that the output signal of the record electronics A10 is capable of driving the transducer A8 which accordingly inscribes the 960 c.p.s. signal as a reference track on tape A5. The concurrent application of that signal to a phase detector A30 is of no consequence due to the fact that in the record mode this phase detector A30 is rendered inoperative by a mode switch A23 to be described below.

It can be seen now that during the transmit-record mode the line-synchronous reference signal is inscribed on the tape in particular spatial relationship with reference to the concurrently recorded line-synchronously produced data signal. The recorded reference signal, therefore, represents the phase and frequency fluctuations to which the facsimile scanning and signal forming process was subjected due to such fluctuations of the power line. Moreover, should the tape speed vary during this recording process, such variations appear as variations in the wavelengths of the data and of the reference signal as recorded on the tape, but the phase relationship between data and reference signals remain unaffected by such tape speed variations.

The tape A5 is driven by a drive motor denoted in general as a tape drive unit A21. The drive motor can be of any suitable type, but preferably it is an AC motor of the induction type, for example, a capacitor motor. The load of the motor, which is the tape, may be such that without further measures the motor would run and the tape would be advanced at a speed in excess of the desired speed. For purposes of control the induction motor will be subjected to a braking force as a simulated overload condition if, in addition to its AC power supply, it receives a DC signal. If a particular, i.e., fixed, DC voltage is applied to such an induction motor, it will be retarded to some extent, but it will run at a constant speed provided the frequency of the AC voltage driving it remains constant also. By increasing or decreasing the braking force one can obtain a speed regulation for such an AC induction motor.

The DC voltage applied to the motor for purposes of braking is controlled through a braking control unit A22. This unit A22 is provided to convert a controlled DC input signal into a DC signal which is superimposed upon the AC wave train driving the motor A21. Circuits of this type are shown for example, in U.S. patent applications by Kenneth Clunis, Ser. No. 626,126 (attorney's docket No. 25,420) and by Peter Amass Ser. No. 675,-243 of common assignee.

During the record mode unit A22 receives a constant signal through the mode switch A23 so as to provide constant tape speed conditions. Mode switch A23 can be ganged with or otherwise linked to mode switches A9 and A3. The tape drive is not being regulated otherwise during the record mode. The tape speed is constant only to the extent that the inertia of the tape drive eliminates transient type fluctuations in the power line frequency. Tape flutter is not being eliminated.

In summary, for the transmit-record mode: A facsimile picture is scanned in synchronism with the local power line frequency and a corresponding signal is formed and recorded on a tape concurrently with a reference signal which is also derived from the power line. The tape is advanced by a motor operated under constant speed but open loop condition, i.e., without feedback control.

During the facsimile transmit-reproduce mode the signals representing image information as well as the reference signals are being read from the tape A5. The data reproduction and passage to the transmission channel C has been described already above. The processing of the reproduced reference signal and the control of the tape drive in accordance therewith is carried out as follows.

In the transmit-reproduce mode a source A25 providing a frequency standard is used for tape motion control. This unit A25 includes an oscillator, for example, a piezoelectric crystal oscillator 26 driven from a constant DC voltage puower supply and providing, for example, a frequency of 15.36 kc. A Schmitt trigger 27 is connected to convert the sinusoidal output of oscillator 26 into a square wave signal. A series of cascaded toggle flip-flops form a frequency divider stage 28 to provide for binary division of the oscillator output. The binary stage 28 may include four cascaded DC toggle flip-flops to provide a 1:16 frequency reduction. The output of stage 28 has a frequency of 960 c.p.s. accordingly and constitutes the output signal of unit A25.

Since, in the transmit-reproduce mode, switch A20 has the alternative position, this 960 c.p.s. output signal of unit A25 is applied to one of the two input terminals of a phase detector A30. It should be noted that the concurrent application of this signal to unit A10 is of no consequence due to the fact that in the reproduce mode switch A9 separates unit A10 from the transducer A8. The second input for the phase detector A30 is provided by the signals read by the transducer A8 from the reference track in this alternative position of the mode switch A9. The output signal of the transducer A8 is first processed in a reproduce electronic network A31 which provides suitable signal and impedance levels and feeds its output signal which is representative of the signal read from the reference track, to the second input of the phase detector A30.

The phase detector A30 provides a DC output signal which is representative of the phase relationship between the crystal controlled reference signal from unit A25 and the reference signal as read from the tape and which characteristically represents the line frequency as it was recorded on the tape during the facsimile transmit-record mode. The DC output signal of the phase detector A30, therefore, includes all errors, particularly all phase and frequency errors which have occurred during facsimile signal production, the recording thereof, as well as during the reproduce operations.

In the transmit-reproduce mode, mode switch A23 is also in the alternative position so that the output of phase detector A30 is applied to the motor control circuit A22 so as to cause variable braking of motor A21 in accordance with the variations of the output of phase detector A30. The tape speed is therefore, controlled toward a particular constant phase as between the reference signal from unit A25 and the reproduced line reference.

It would be incorrect to say that the motion control tends to control towards constant speed as a constant tape speed is not the ultimate objective at this point. The ultimate objective is a constant phase of the reproduced data and here, most particularly, a constant line repetition rate, i.e., scanning rate of the facsimile signal. This, in turn, is automatically accomplished if the reproduction of the reference signals yields a constant frequency signal which is obtained by the control of the tape as outlined. All errors in the reference signal which may have occurred, for example, due to irregular speed scanning, irregular tape speed during recording and now irregular tape speed during reproducing are intended to be controlled and to be eliminated, which may well lead to intentional tape speed variations induced at that point.

The tape speed is controlled so that facsimile scanning signal, as it now appears in the circuit A6–A7, is in synchronism with the constant frequency reference as provided by unit A25 and here particularly by oscillator 26, regardless of irregularities, even in the initial formation of the facsimile signal in the transmitter A1, in the recording of the signal on tape and/or in the subsequent reproduction. Hence, the reproduced facsimile signal, as applied to transmitter A7, is essentially independent from the local power line. One can see now that the accuracy of the data signals in time as transmitted into channel C depends primarily on the constancy of the frequency of crystal 26.

For further fine control, and in case the facsimile signal is a frequency modulated signal, a line A32 may be provided between the output signal of the reference track transducer or, better, of the processing unit A31 and the data reproduce circuit A6 to introduce a speed variable delay into the reproduction process period. The open loop fine control obtained in such a manner is disclosed in application of one of us, Serial No. 648,300.

In the foregoing we have described the transmit-record and transmit-reproduce mode of facsimile station A. In the following we shall describe the receive-record and receive-reproduce modes which may occur in either station but which, for purposes of describing a full system, are described with reference now to station B. Elements in station B, which directly correspond to elements already described with reference to station A, have the same reference numeral preceded by the latter "B." Elements described in the following for the first time and as particularly related to the receive modes, will also be included in station A when that station operates in either of the two receive modes.

The station B has a signal receiver B33 which in any suitable manner is coupled to the transmission facility, line C, to receive the signals as transmitted by the station A and here particularly by the signal transmitter A7 thereof. The signal receiver B33 is connected to the record circuit B2 which converts the signal as provided by the receiver B33 to a signal capable of driving the transducer B4. In this receive-record mode the mode switch B3 connects the output of the circuit B2 to the data transducer B4 of station B. In that mode there will also be inscribed a reference track by the transducer B8, but for this mode the reference signal to be recorded is derived from the crystal reference unit B25 and which includes elements similar to unit A25. The mode switch B20 is in the illustrated position and applies this 960 c.p.s. reference signal from unit B25 to the record electronics B10 to establish a signal at a power and impedance level suitable for recording by the reference transducer B8. The concurrent application of the same signal to the phase detector B30 is of no consequence due to the position of mode switch B23. The tape drive unit B21 is controlled from the brake control unit B22 in the record mode in the same manner regardless whether the station is in the transmit or receive mode. Thus, the mode switch B23 provides a constant DC signal to the brake control B22 to operate the tape drive at open loop, constant speed control configuration as described.

Again the tape B5 may undergo some fluctuations but the data as they are being recorded by the data transducer B4 are accompanied by a reference signal derived ultimately from the crystal in unit B25 so that again a particular phase relationship between the two signals is established on the tape. One can see that this recording process during the receive-record mode in station B concurs with the transmit-reproduce mode of the data in station A. Furthermore, it is presumed that the two oscillators respectively in the two stations are accurately constant to the extent that one can regard them as being in synchronism. That may include a constant phase error which is of negligible consequence because the line rate frequency is several orders of magnitude smaller. Most importantly, ab initio, there is a fixed relationship between the reference frequency produced by the crystal unit A25 in station A during its reproduce-transmit mode feeding signals into the line C and the crystal reference unit B25 of station B in its record-receive mode during which these signals from channel C are being recorded onto the tape B5 accompanied by the reference signal provided by the unit B25.

The final mode to be described is the receive-reproduce mode during which the facsimile receiver B34 produces an image by composing such an image from the signals read from the tape B5. In this mode, the switches B2, B20 and B23 and B9 assume positions opposite to the ones illustrated. As far as data reproduction is concerned, the data transducer B4 then feeds its output signals through the mode switch B2 into the reproduce circuit B6 and the output signals thereof are fed to the facsimile receiver B24 for image composition. It is presumed that the receiver B24 is connected to the local power source, which is an AC source 100, possibly having no phase relation to the mains 10 at the locality of station A. In actuality, the frequencies may even differ.

The tape motion is controlled as follows. The brake circuit B22 receives a DC signal from the phase detector B30 analogous to the motor control in the reproduce mode of station A described above. Accordingly, the mode switch B9 feeds the signal read by transducer B8 from the reference track to the reproduce electronic B31 which establishes a suitable power and impedance level and feeds its output signal to one side of the phase detector B30. The other input side of the phase detector B30 receives a reference signal from the line unit B11 through the mode switch B20 in its alternative position. Unit B11 is similar to the unit A11 described above, i.e., it provides a 960 c.p.s. reference signal phased to the power line frequency. Therefore, the phase signal provided by the unit B30 represents the possibly variable phase deviations between the reproduced reference signal and the power line frequency signal. Since the facsimile receiver B24 operates in synchronism with a local power line 100 the reproduction process, and particularly the speed control for the tape B5, is provided to establish a particular phase relationship between the image composition process and the rate with which data signals are being read from the tape by controlling the tape drive in phase relationship to the power line. One can see, therefore, that the conventionally necessary linking of power lines in the facsimile transmitter and facsimile receiver station is not necessary.

Concerning the various operate modes of an individual station, one can see that the switches B2, B9 and B23 (or A2, A9, A23) have positions exclusively determined by the desired operation of the respective tape unit, i.e., the position of these mode switches determines recording or reproducing regardless of transmit or receive modes of the facsimile unit. Mode switch B20 (or A20), however, has the same position in the transmit-record and in the receive-reproduce mode placing the line reference unit B11 (or A11) into the system, while the opposite position of this mode switch is common to the transmit-reproduce and the receive-record mode for which the crystal reference unit B25 (or A25) is used. In addition, of course, a set of mode switches is needed to distinguish merely between transmit and receive modes. These additional mode switches are not shown, but their inclusion follows logically from the description above.

The data record circuit A2 (B2) connects either to the facsimile transmitter (transmit mode) or to the signal receiver coupled to the transmission line C (receive mode). The reproduce circuit A6 or B6 connects either to the signal transmitter or to the facsimile receiver. The system, as described, is susceptible to various modifications, among them the separate provision of record and reproduce transducers, or the utilization of a single transducer (or of a pair of record and reproduce transducers) for single track recording whereby the information and reference signals are multiplexed.

Among the several aspects of the invention is the fact that method and system are essentially independent from the type of facsimile unit used, whereby the record-reproduce device in either station permits communication between facsimile systems which may otherwise be incompatible. This principle can be enhanced further if the record circuit (A2) includes its own modulator for connection to a terminal in the facsimile transmitter which provides the base band signal directly, that modulator portion to be used only in the transmit-record mode. The reproduce circuit B6 may then include a demodulator, to be used only in the receive-reproduce mode and driving directly that element in the facsimile receiver which responds to the facsimile base band signal for image formation. For those cases in which the facsimile signal leaves the facsimile transmitter as amplitude modulation using a carrier which is derived from the mains, the reference track can be entirely dispensed with, at least in the station when operating in the transmit mode, and in the transmit-reproduce mode the signal reproduced by transducer A4 is then additionally fed to the phase detector A30, the second input thereof still receiving the frequency standard from unit A25. On the receiver side one can operate similarly, using again the reproduced signal additionally in the phase detector B30 which has as second input the line standard from unit B11.

The invention is not limited to the embodiments described above but all changes and modifications thereof not constituting departures from the spirit and scope of the invention are intended to be covered by the following claims.

What is claimed is:

1. An apparatus for cooperation with a power line driven facsimile unit which includes a facsimile transmitter converting image information into an electrical signal and which further includes a facsimile receiver composing an image from information included in an electrical signal comprising:

a storage medium having characteristics of reproducibly storing information;

first means connected to the local power line for providing a first reference signal having a particular constant relationship to the power line frequency;

second means for providing a second reference signal having a fixed, standard frequency independent from the power line frequency;

third means for selectively providing to and receiving from an external transmission facility facsimile signals;

transducing means disposed in relation to the storage medium for recording thereon and reproducing therefrom electrical information signals and reference signals;

fourth means for selectively connecting the transducing means to the facsimile unit and to the third means for causing the transducing means to selectively record the electrical signal of the facsimile transmitter of the facsimile unit or the one received from the third means as information signals;

fifth means for selectively connecting the transducing means to the first and second means for respectively recording the first and second signals as reference signals, when the transducing means records also information signals;

sixth means operative when the transducing means reproduces information and reference signals from the storage medium for selectively connecting the transducing means to the facsimile receiver and to the third means for passing thereto information signals reproduced from the storage medium; and seventh means coupled to the storage medium for controlling the motion of the storage medium during concurrent reproduction of information signals and reference signals in dependence upon the reproduced reference signals and in selective dependence upon the first and second reference signals when the sixth means causes the reproduced facsimile signals to be passed to the facsimile receiver or to the third means.

2. A system for the transmission of facsimile signals from a facsimile means in a station to a second station, which facsimile means is provided for connection to the local power line for converting an image into an electrical signal, under control of the local power line comprising:

first means for recording and reproducing in the first station the electrical signal together with a first reference signal, there being means connected to the local power line for providing a first reference signal in a particular phase relationship to the production of the electrical signal as controlled from the local power line;

a source of first standard frequency signals in the first station, the phase and frequency of the signals being maintained constant to the extent required for control of facsimile operation;

second means coupled to the first means for controlling the rate of reproduction of the recorded first reference signals and of the recorded electrical signals, in response to phase comparison between the first standard frequency signals and the reproduced first reference signals;

third means coupled to the first means for transmitting the reproduced electrical signals from the first to the second station;

a source of second standard frequency signals in the second station, the phase and frequency of the second standard frequency signals being constant comparably with the first standard frequency signals and bearing a particular constant temporal relation thereto though being independent therefrom; and fifth means in the second station for processing the transmitted electrical signals in particular relation to the second standard frequency signals.

3. A system as set forth in claim 2, the fifth means including means for recording the transmitted electrical signals together with the second standard frequency signals.

4. A system as set forth in claim 3, the second station further including means for reproducing the recorded electrical signals and the recorded second standard frequency signals at a rate controlled for a constant phase between the reproduced second standard frequency signals and signals derived from the local power line at the second station; and means for composing an image from the reproduced electrical signals under control of the local power line.

5. A system for the transmision of facsimile signals from a first station to a facsimile image composer in a second station, the image composition being obtained under control of the local power line at the second station, comprising:

a source of first standard frequency signals in the first station, the phase and frequency of the signals being maintained constant to the extent required for control of facsimile operation;

first means for providing in the first station a facsimile signal at a rate controlled towards phase synchronism with the first standard frequency signal;

signal means for transmitting the facsimile signal from the first station to the second station;

a source of second standard frequency signals in the second station, the phase and frequency of the second standard frequency signals being constant comparably with the first standard frequency signals and bearing a particular relation thereto though being independent therefrom;

third means in the second station for recording and reproducing the facsimile signal as received from the second means together with the second standard frequency signal; and fourth means in the second station for controlling the rate of reproduction of the recorded facsimile signals and of the recorded second standard frequency signal for a constant phase between the reproduced second standard frequency signal and a signal derived from the local power line in the second station.

6. An apparatus for providing facsimile transmission, which includes a facsimile means for connection to the local power line for converting an image into an electrical signal, the combination comprising:

a transmitter for connection to a transmission facility for transmitting thereto signals to be transmitted further by the transmission facility, a storage medium having characteristics of reproducibly storing information;

first means connection to the local power line for providing a first reference signal having a particular phase relationship to the production of the electrical signal as controlled from the local power line;

transducing means coupled to the storage medium and connected for recording said electrical signal and said first reference signal on the storage medium, in the record mode, and further connected in the reproduce mode for reproducing said electrical signal and said first reference signals, and feeding said reproduced electrical signal to the transmitter;

second means for providing a second reference signal independently from the power line; and third means coupled to the storage medium for moving the storage medium past the transducing means during the record mode, and in accordance with a particular constant temporal relationship between the second reference signals and the reproduced first reference signals in the reproduce mode.

7. In an apparatus for processing facsimile signals the combination comprising a receiver for receiving electrical signals from a transmission facility a facsimile means for converting a facsimile signal into an image in synchronism with the local power line frequency, a storage medium having characteristics of reproducibly storing information;

first means for providing first reference signals having a constant frequency and a phase independently from the local power line frequency;

transducing means coupled to the storage medium and connected for recording said electrical signal and said first reference signal on the storage medium, in the record mode, and further connected in the reproduce mode to said facsimile means for feeding thereto the reproduced electrical signals as facsimile signals and providing separately the reproduced first reference signals;

second means connected to the local power line for providing a second reference signal having a particular constant phase relationship to the production of an image by facsimile means as controlled from the local power line; and third means coupled to the storage medium for moving the storage medium past the transducing means during the record mode, and in accordance with a particular constant temporal relationship between the second reference signals and the reproduced first reference signals in the reproduce mode.

8. An apparatus for providing facsimile transmission, comprising:

facsimile means for connection to the local power line for converting an image into an electrical signal;

a transmitter for passing signals to a signal transmission facility for the transmission of such signals to a remote location;

a storage medium having characteristics of reproducibly storing information;

a transducing means disposed in relation to the storage medium and for selectively recording thereon information and reference signals and reproducing therefrom the recorded information and reference signals;

means coupled to the storage medium for moving the storage medium past the transducing means;

first means connected to the local power lines for providing a first reference signal having a particular constant temporal relationship to the power line frequency;

second means for providing a second reference signal having a fixed standard frequency independent from the power line frequency;

third means connecting the facsimile means to the transducing means for feeding thereto the electrical signal as information signals for recording, and selectively connecting the transducing means to the signal transmitter for feeding thereto the reproduced information signals for transmission;

fourth means for connecting the first means to the transducing means for obtaining a recording on the storage means of the first signal as reference signal;

fifth means connected to the transducing means and being responsive to the reproduced reference signal; and control means connected to the first and second means and being respectively responsive to the reproduced reference signal and the second reference signals and controlling the means for moving to obtain a particular constant temporal relationship between the reproduced reference signal and the second reference signal, during the reproduction of the recorded information.

9. An apparatus for receiving facsimile information comprising:

facsimile means for connection to the local power supply for converting an electrical signal into an image;

receiving means for receiving externally produced electrical signal representing facsimile information;

a storage medium having characteristics of reproducibly storing information;

transducing means disposed in relation to the storage medium for selectively recording thereon information and reference signals and reproducing therefrom the information and the reference signals;

means coupled to the storage medium for moving the storage medium past the transducing means;

first means for providing a first reference signal having a particular constant relationship to the power line frequency;

second means for providing a second reference signal having a fixed standard frequency independent from the power line frequency;

third means for connecting the receiving means to the transducing means for feeding thereto the electrical signal received by the receiving means as information signal for recording thereof and for selectively connecting the transducing means to the facsimile means for feeding thereto the reproduced information for conversion into an image;

fourth means for connecting the second means to the transducing means for obtaining a recording on the storage means of the second signal as reference signal together with the recording of the received facsimile signal;

fifth means connected to the transducing means and being responsive to the reproduced reference signals; and control means connected to the fifth and first means and being respectively responsive to the reproduced reference signal and the first reference signal and controlling the means for moving to obtain a particular constant temporal relationship between the reproduced reference signals and the first reference signals during the reproduction of the recorded information.

10. The method for transmitting facsimile information from a first station in which facsimile information is produced in representation of an image in synchronism with the local power line frequency, to a second station in which facsimile information is used to compose a visible image also in synchronism with the local power line frequency at the second station comprising the steps of:

recording in the first station the facsimile signal as produced and a reference signal representative of the power line frequency at the first station;

reproducing in the first station the recorded signals and controlling the rate of reproduction for maintaining a particular constant temporal relationship between the reproduced power line frequency and a frequency standard;

transmitting the reproduced facsimile signal from the first to the second station;

recording in the second station the facsimile signal as transmitted from the first station and a second frequency standard signal;

reproducing in the second station the recorded signal for composing an image of the facsimile information included in the reproduced facsimile signal; and controlling the rate of reproduction for obtaining a particular constant temporal relationship between the reproduced second frequency standard signal and the power line frequency at the second station.

11. The method for transmitting facsimile information from a first station to a second station, comprising the steps of producing in the first station a facsimile signal, in representation of an image in synchronism with the local power line frequency, recording in the first station the facsimile signal as produced and a reference signal representative of the power line frequency at the first station;

reproducing in the first station the recorded signals and controlling the rate of reproduction for obtaining a particular constant temporal relationship between the reproduced power line frequency and a frequency standard;

transmitting the reproduced facsimile signal from the first to the second station;

and processing the transmitted facsimile signal in the second station in synchronism with a frequency standard signal bearing a fixed relationship to the frequency standard signal in the second station, but being independent therefrom.

12. The method for transmitting facsimile information from a first station to a second station comprising the steps of:

providing in the first station the facsimile signals in synchronism with a frequency standard signal;

transmitting the facsimile signal as provided from the first to the second station;

recording in the second station the facsimile signal as transmitted from the first station and a second frequency standard signal;

reproducing in the second station the recorded signal for composing an image of the facsimile information included in the reproduced facsimile signal;

composing an image of the facsimile signal included in the reproduced facsimile signal in synchronism with and under control of the local power line frequency at the second station;

and controlling the rate of reproduction for obtaining a particular constant temporal relationship between the reproduced second frequency standard signal and the power line frequency at the second station.

13. An apparatus for cooperation with a power line driven facsimile device selectively providing electrical signals representing image information and composing images from electrical signals which include image information, and for further cooperation with means coupled to an external transmission facility for providing thereto and receiving therefrom electrical signals, the combination comprising:

a record-reproduce system including a movable storage medium, transducing means coupled to the storage medium for recording thereon and reproducing therefrom information, and means coupled to the storage medium for moving same past the transducing means;

first means selectively connecting the transducing means to the facsimile device and to the means coupled to the transmission facility for selective transfer of electrical signals in either direction for either one of the selective connections;

second means coupled to the means for moving and connected to the power line for controlling the means for moving in response to the power line frequency during transfer of signals from the record-reproduce system to the facsimile device;

third means coupled to the means for moving and including a reference standard for controlling the means for moving in dependence upon the reference standard during transfer of signals from the record-reproduce system to the means coupled to the transmission facility; and fourth means coupled to the means for moving, for controlling the means for moving independently from the second and third means during signal transfer in the respective opposite directions as obtained by operation of the second and third means.

References Cited

Davies, Gomer L.: Magnetic Tape Instrumentation, New York, McGram-Hill, 1961, pp. 137–152.

ROBERT L. GRIFFIN, Primary Examiner

H. W. BRITTON, Assistant Examiner

U.S. Cl. X.R.

179—100.2; 340—174.1